(12) United States Patent
Ming

(10) Patent No.: US 10,298,884 B2
(45) Date of Patent: May 21, 2019

(54) SYSTEM AND METHOD OF PRECISION REMOTE PTZ CONTROL OF IP CAMERAS

(71) Applicant: Honeywell International Inc., Morristown, NJ (US)

(72) Inventor: Wan Wei Ming, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 875 days.

(21) Appl. No.: 14/273,921

(22) Filed: May 9, 2014

(65) Prior Publication Data

US 2015/0326828 A1 Nov. 12, 2015

(51) Int. Cl.
*H04N 7/18* (2006.01)
*H04N 5/232* (2006.01)

(52) U.S. Cl.
CPC ......... *H04N 7/181* (2013.01); *H04N 5/23216* (2013.01); *H04N 5/23238* (2013.01); *H04N 7/18* (2013.01)

(58) Field of Classification Search
CPC ............... H04N 7/181; H04N 5/23216; H04N 5/23238; H04N 7/18
USPC ........................................................ 348/159
See application file for complete search history.

(56) References Cited

U.S. PATENT DOCUMENTS

| 2010/0002070 A1 | 1/2010 | Ahiska | |
| 2010/0033567 A1 | 2/2010 | Gupta et al. | |
| 2014/0002645 A1* | 1/2014 | Chiu | H04N 7/18 348/143 |
| 2014/0085412 A1* | 3/2014 | Hayashi | G06T 11/60 348/37 |
| 2014/0118600 A1* | 5/2014 | Son | H04N 5/23293 348/333.11 |
| 2014/0375801 A1* | 12/2014 | Park | H04N 7/183 348/143 |
| 2015/0201134 A1* | 7/2015 | Carr | G06F 3/04842 348/143 |

OTHER PUBLICATIONS

Extended European search report for corresponding EP patent application 15164917.5, dated Sep. 18, 2015.

* cited by examiner

*Primary Examiner* — Mehrdad Dastouri
*Assistant Examiner* — Joseph W Becker
(74) *Attorney, Agent, or Firm* — Seager, Tufte & Wickhem LLP

(57) ABSTRACT

Systems and methods of precision remote PTZ control of IP cameras are provided. Some methods include capturing a plurality of images, each image in the plurality of images corresponding to an angle into which a video surveillance device can be positioned, receiving user input indicating a desired position of the video surveillance device, displaying one of the plurality of images, the one of the plurality of images corresponding to the desired position of the video surveillance device, receiving user input confirming the one of the plurality of images, and transmitting instructions to the video surveillance device, the instructions containing coordinate information corresponding to the one of the plurality of images.

10 Claims, 3 Drawing Sheets

SYSTEM AND METHOD OF PRECISION REMOTE PTZ CONTROL OF IP CAMERAS

FIELD

The present invention relates generally to the PTZ control of IP cameras. More particularly, the present invention relates to a system and method of precision remote PTZ control of IP cameras.

BACKGROUND

It is known in the art that there is an operation delay in the remote PTZ (pan, tilt, zoom) control of IP (Internet protocol) cameras. Indeed, the latency of the PTZ control of an IP camera is a key parameter of a system that incorporates IP cameras with PTZ control.

In many commercial scenarios, operation of the PTZ control of an IP camera is in a local network. Accordingly, the latency and operation delay can be somewhat controlled. However, even in these scenarios, the latency and operation delay is longer than analog PTZ control.

When operation of the PTZ control of an IP camera is via the Internet, the complicated network environment causes the latency and operation delay to be longer than in a local network. Indeed, as mobile applications and 3G and 4G networks become more popular and user traffic increases accordingly, the latency and operation delay of the PTZ control of IP cameras via the Internet is becoming longer and more unpredictable.

Two systems and methods for remote PTZ control of IP cameras are known in the art. First, PTZ can be controlled via a user interface that includes directional arrows, such as buttons with arrows in different directions. Second, PTZ can be controlled via a user interface that includes slide bars that can be moved in different directions. However, the user may need to perform several operations and provide more than one input to move the PTZ of the IP camera to a desired position.

Furthermore, both known systems and methods have delays from when the user provides input to when the IP camera moves in accordance with the user's input to when the user receives video confirmation that the IP camera moved in accordance with his input, which may assist the user in determining his next input. Indeed, during this latent period, the user may be uncertain as to whether his input was successfully received and executed. Accordingly, the user may provide additional PTZ control input during the latent period, which may cause unexpected and/or undesired movement of the IP camera.

Preset positions of the PTZ of an IP camera have been used to overcome the operation delays and latent periods described above. For example, the user can provide input to move the IP camera to one of a plurality of preset positions. However, the use of preset positions is often undesirable because the user is limited in the positions to which he can move the IP camera.

In view of the above, there is a continuing, ongoing need for improved systems and methods of remote PTZ control of IP cameras.

DETAILED DESCRIPTION

Figure 1A:
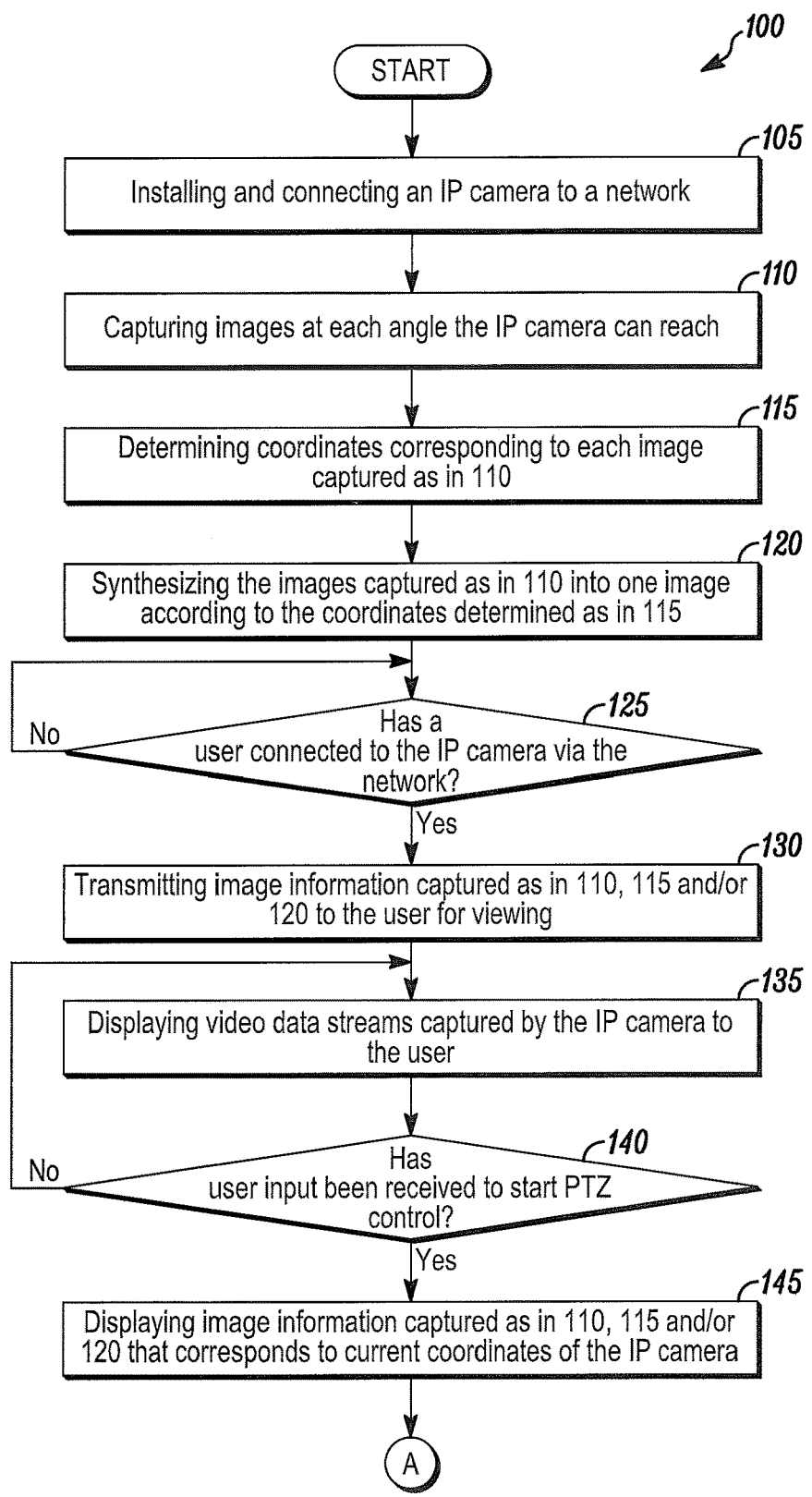
FIG. 1A is a flow diagram of a method in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods of precision remote PTZ control of IP cameras. For example, a user can locally control the PTZ of a remote IP camera before control instructions are transmitted to the IP camera.

In some embodiments, systems and methods disclosed herein can provide the user with a prompt to provide input. The user can provide input that indicates a desired position of a remote IP camera and can also confirm the desired position of the remote IP camera. Then, systems and methods disclosed herein can transmit PTZ position parameters to the remote IP camera, and the IP camera can pan, tilt, and zoom in accordance with the received PTZ position parameters. Accordingly, the IP camera can perform a single operation to move to the desired position, and the user need not wait for feedback from the IP camera to determine a next action for controlling the camera.

When an IP camera with PTZ control is installed in and connected to a network, systems and methods disclosed herein can execute a software program to obtain images captured by the camera when the camera is in a plurality of different PTZ positions. For example, an image can be captured at each angle the camera can reach and corresponding coordinates of the camera and/or capture image at each angle can be determined. Then, systems and methods disclosed herein can synthesize the captured images into one image according to coordinates.

When a user connects to the network and/or to the IP camera on the network, via, for example, a local computer or the like, the previously obtained image information can be transmitted to the user. During operation, video data streams captured by the IP camera can be transmitted to the user for viewing and, when the user provides input to start PTZ control of the IP camera, systems and methods disclosed herein can change from displaying video data streams captured by the IP camera to displaying the previously captured image corresponding to the current coordinates of the camera.

The user can provide input to indicate a desired position of the IP camera. Based on the user input, systems and methods disclosed herein can determine coordinates for the camera that correspond to the desired position and then display the previously captured image that corresponds to the desired coordinates. Accordingly, the user can view the image and confirm the image and/or view that will be achieved by the operation caused by the user input before the operation is executed.

After the user provides input confirming the desired position, coordinates, image, and/or view, systems and methods disclosed herein can send instructions to the IP camera with PTZ coordinate information corresponding to the desired position, and the PTZ of the camera can move accordingly. Then, systems and methods disclosed herein can switch back to displaying video data streams captured by the IP camera.

Figure 1B:
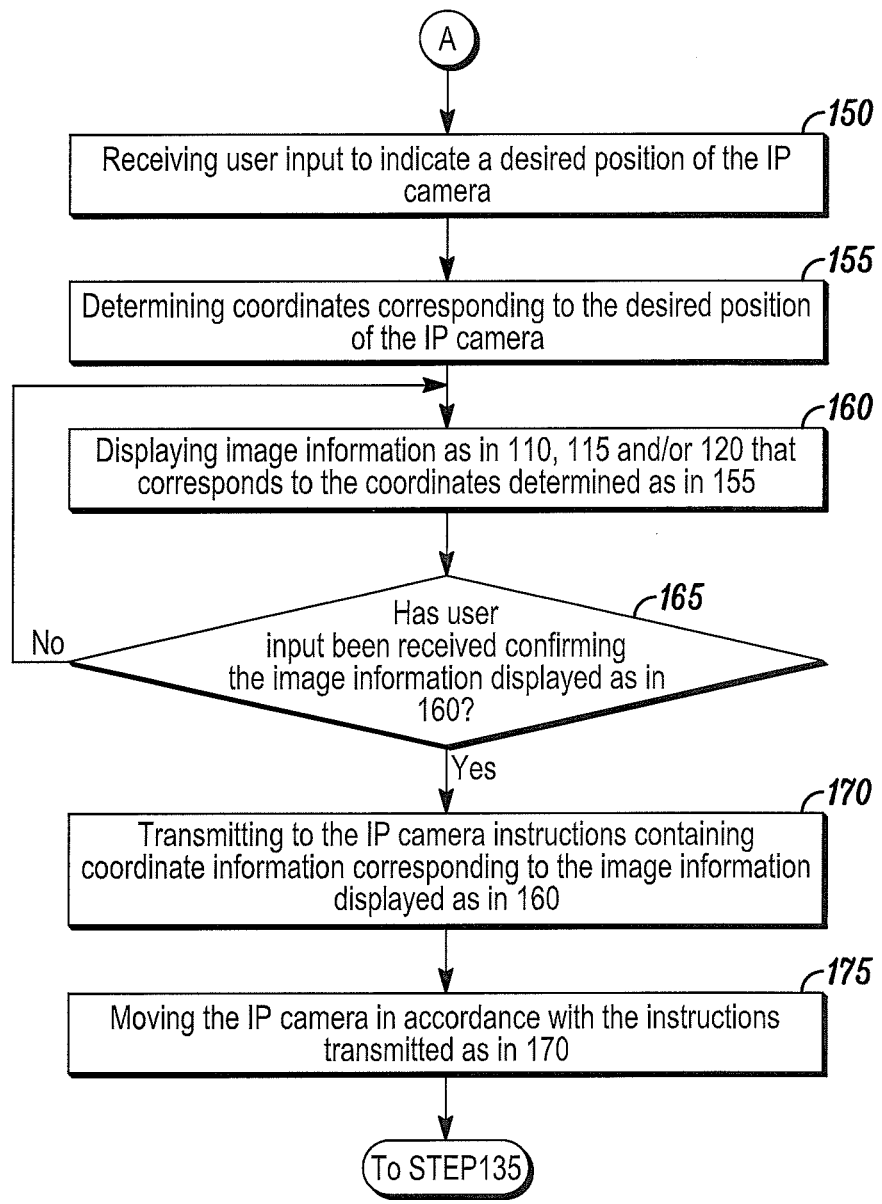
FIG. 1B is a continuation of the flow diagram shown in FIG. 1A.

FIGS. 1A and 1B are flow diagrams of a method 100 in accordance with disclosed embodiments. As seen, an IP camera with PTZ control can be installed in and connected to a network as in 105. Then, the IP camera can capture images at each angle the camera can reach as in 110, coordinates corresponding to each image captured as in 110 can be determined as in 115, and, as in 120, the images captured as in 110 can be synthesized into one image according to the coordinates determined as in 115.

When the method 100 determines that a user has connected to the IP camera via the network as in 125, the image information captured as in 110, 115, and/or 120 can be transmitted to the user as in 130. Then, video data streams captured by the IP camera can be transmitted and displayed to the user as in 135. When the method 100 determines that user input has been received to start PTZ control of the IP camera as in 140, the image information captured as in 110, 115, and 120 that corresponds to the current coordinates of the IP camera can be displayed to the user as in 145, for example, in lieu of the previously displayed video data stream.

The user can provide input to indicate a desired position of the IP camera as in 150, coordinates corresponding to the desired position can be determined as in 155, and the image information captured as in 110, 115, and/120 that corresponds to the coordinates determined as in 155 can be displayed as in 160. When, as in 165, the method 100 determines that the user has confirmed the image information displayed as in 160, instructions containing coordinate information corresponding to the image information displayed as in 160 can be transmitted to the IP camera as in 170, and the IP camera can move in accordance with the received instructions as in 175. Finally, video data streams captured by the IP camera can be displayed to the user once again as in 135.

Figure 2:
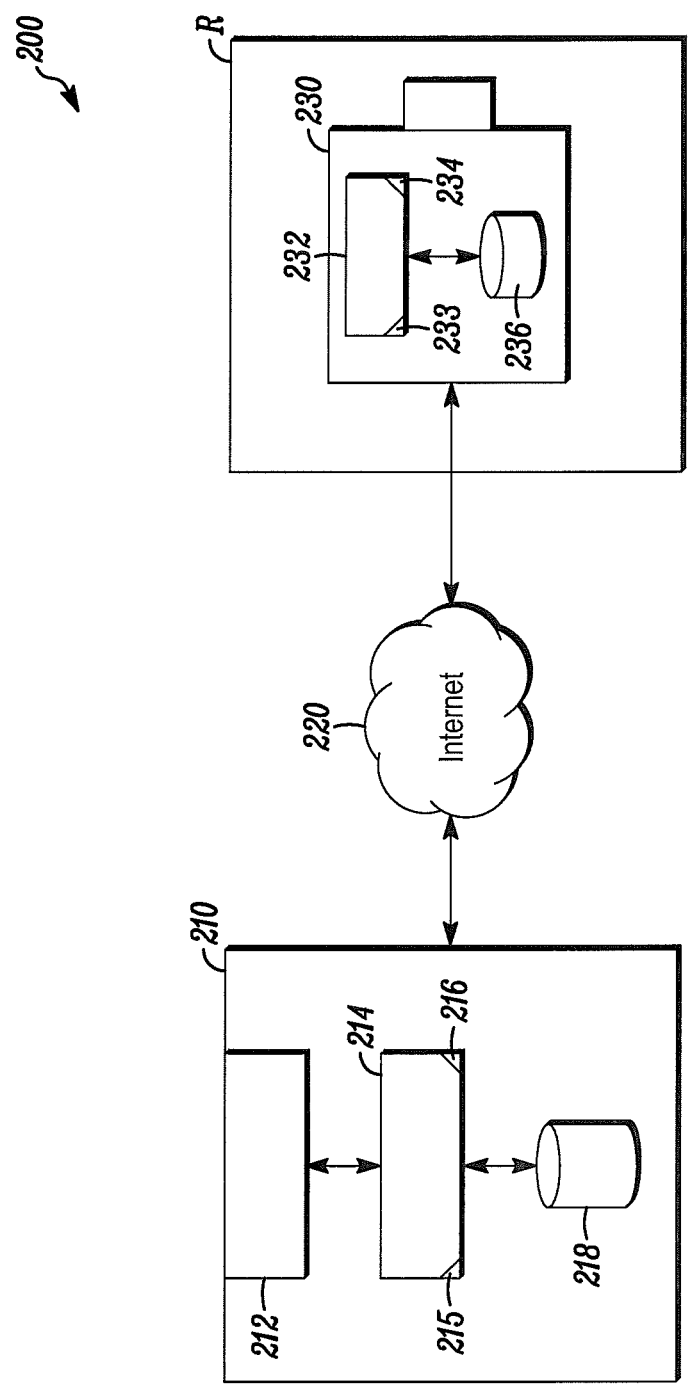
FIG. 2 is a block diagram of a system in accordance with disclosed embodiments.

FIG. 2 is a block diagram of a system 200 in accordance with disclosed embodiments. As seen in FIG. 2, the system 200 can include a system 210 local to a user that is connected, via a network 220, for example, the Internet, to an IP camera 230 in a remote monitoring region R.

In some embodiments, the system 210 can include a user's workstation, laptop, desktop, personal digital assistant, smart phone, or other computing device as would be known and desired by those of skill in the art. The system 210 can include a user interface 210, a memory device 218, control circuitry 214, one or more programmable processors 215, and executable control software 216 as would be understood by those of ordinary skill in the art. The executable control software 216 can be stored on a transitory or non-transitory local computer readable medium, including, but not limited to, local computer memory, RAM, optical storage media, magnetic storage media, flash memory, and the like. In some embodiments, the control circuitry 214, the programmable processors 215, and/or the control software 216 can execute and control some or all of the methods described above.

As seen in FIG. 2, the IP camera can also include a memory device 236, control circuitry 232, one or more programmable processors 233, and executable control software 234 as would be understood by those of ordinary skill in the art. The executable control software 234 can be stored on a transitory or non-transitory local computer readable medium, including, but not limited to, local computer memory, RAM, optical storage media, magnetic storage media, flash memory, and the like. In some embodiments, the control circuitry 232, the programmable processors 233, and/or the control software 234 can execute and control some or all of the methods described above.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A method comprising:

repositioning a single video surveillance device into a plurality of pan, tilt, zoom positions;

the single video surveillance device capturing a plurality of static images at the plurality of pan, tilt, zoom positions;

associating each of the plurality of static images with a respective one of the plurality of pan, tilt, zoom positions;

displaying a current video data stream from the single video surveillance device, the current video data stream including current video data from an initial field of view of the single video surveillance device corresponding to a current one of the plurality of pan, tilt, zoom positions of the single video surveillance device;

receiving a first user input to start pan, tilt, zoom control of the single video surveillance device;

responsive to receiving the first user input, selecting a current one of the plurality of static images for which the respective one of the plurality of pan, tilt, zoom positions is equal to the current one of the plurality of pan, tilt, zoom positions of the single video surveillance device;

stopping display of the current video data stream and, responsive thereto, displaying the current one of the plurality of static images;

receiving a second user input indicating a desired position of the single video surveillance device, the desired position corresponding to a resulting one of the plurality of pan, tilt, zoom positions of the single video surveillance device that is different than the current one of the plurality of pan, tilt, zoom positions of the single video surveillance device;

responsive to receiving the second user input, selecting a resulting one of the plurality of static images different from the current one of the plurality of static images and for which the respective one of the plurality of pan, tilt, zoom positions is equal to the resulting one of the plurality of pan, tilt, zoom positions of the single video surveillance device;

stopping display of the current one of the plurality of static images and, responsive thereto, displaying the resulting one of the plurality of static images;

receiving a third user input confirming the resulting one of the plurality of static images;

responsive to the third user input, transmitting instructions to the single video surveillance device, the instructions containing positioning information corresponding to the resulting one of the plurality of pan, tilt, zoom positions of the single video surveillance device;

responsive to receiving the instructions, the single video surveillance device repositioning to the resulting one of the plurality of pan, tilt, zoom positions of the single video surveillance device; and responsive to the single video surveillance device repositioning to the resulting one of the plurality of pan, tilt, zoom positions of the single video surveillance device, displaying a resulting video data stream from the single video surveillance device, the resulting video data stream including resulting video data from a resulting field of view of the single video surveillance device corresponding to the resulting one of the plurality of pan, tilt, zoom positions of the single video surveillance device.

2. The method of claim 1 wherein repositioning the single video surveillance device into the plurality of pan, tilt, zoom positions and capturing the plurality of static images occurs automatically upon installation of the single video surveillance device on a network.

3. The method of claim 1 wherein the single video surveillance device includes an IP camera.

4. The method of claim 1 wherein associating each of the plurality of static images with the respective one of the plurality of pan, tilt, zoom positions includes determining respective coordinates for each of the plurality of pan, tilt, zoom positions of the single video surveillance device.

5. The method of claim 4 further comprising synthesizing each of the plurality of static images into a single image according to the respective coordinates of each of the plurality of pan, tilt, zoom positions of the single video surveillance device.

6. A system comprising:
a user interface;
a programmable processor and executable control software stored on a non-transitory computer readable medium; and
a single video surveillance device that receives first instructions from the programmable processor and the executable control software to reposition to a plurality of pan, tilt, zoom positions and capture a plurality of static images at the plurality of pan, tilt, zoom positions,
wherein each of the plurality of static images is associated with a respective one of the plurality of pan, tilt, zoom positions,
wherein the programmable processor and the executable control software display, on the user interface, a current video data stream from the single video surveillance device,
wherein the current video data stream includes current video data from an initial field of view of the single video surveillance device corresponding to a current one of the plurality of pan, tilt, zoom positions of the single video surveillance device,
wherein the user interface receives a first user input to start pan, tilt, zoom control of the single video surveillance device,
wherein, responsive to receiving the first user input, the programmable processor and the executable control software select a current one of the plurality of static images for which the respective one of the plurality of pan, tilt, zoom positions is equal to the current one of the plurality of pan, tilt, zoom positions of the single video surveillance device, wherein the programmable processor and the executable control software stop display of the current video data stream and, responsive thereto, display, on the user interface, the current one of the plurality of static images, wherein the user interface receives a second user input indicating a desired position of the single video surveillance device, wherein the desired position corresponds to a resulting one of the plurality of pan, tilt, zoom positions of the single video surveillance device that is different than the current one of the plurality of pan, tilt, zoom positions of the single video surveillance device, wherein, responsive to receiving the second user input, the programmable processor and the executable control software select a resulting one of the plurality of static images different from the current one of the plurality of static images and for which the respective one of the plurality of pan, tilt, zoom positions is equal to the resulting one of the plurality of pan, tilt, zoom positions of the single video surveillance device, wherein the programmable processor and the executable control software stop display of the current one of the plurality of static images and, responsive thereto, display, on the user interface, the resulting one of the plurality of static images, wherein the user interface receives a third user input confirming the resulting one of the plurality of static images, wherein, responsive to the third user input, the programmable processor and the executable control software transmit second instructions to the single video surveillance device, wherein the second instructions containing positioning information corresponding to the resulting one of the plurality of pan, tilt, zoom positions of the single video surveillance device, wherein, responsive to receiving the second instructions, the single video surveillance device repositions to the resulting one of the plurality of pan, tilt, zoom positions of the single video surveillance device, wherein, responsive to the single video surveillance repositioning to the resulting one of the plurality of pan, tilt, zoom positions of the single video surveillance device, the programmable processor and the executable control software display a resulting video data stream from the single video surveillance device, and wherein the resulting video data stream includes resulting video data from a resulting field of view of the single video surveillance device corresponding to the resulting one of the pan, tilt, zoom positions of the single video surveillance device.

7. The system of claim 6 wherein the programmable processor and the executable control software automatically direct the single video surveillance device to reposition to the plurality of pan, tilt, zoom positions and capture the plurality of static images upon installation of the single video surveillance device on a network.

8. The system of claim 6 wherein the single video surveillance device includes an IP camera.

9. The system of claim 6 wherein the programmable processor and the executable control software determine respective coordinates for each of the plurality of pan, tilt, zoom positions of the single video surveillance device.

10. The system of claim 9 wherein the programmable processor and the executable control software synthesize each of the plurality of static images into a single image according to the respective coordinates of each of the plurality of pan, tilt, zoom positions of the single video surveillance device.

\* \* \* \* \*